US008913283B2

(12) United States Patent
Berg et al.

(10) Patent No.: US 8,913,283 B2
(45) Date of Patent: Dec. 16, 2014

(54) METHOD FOR DISPLAYING EVENTS IN PRINTING MATERIAL PROCESSING MACHINES AND VIDEO-MONITORED PRINTING MACHINE

(75) Inventors: Winfried Berg, Heidelberg (DE); Gernot Keller, London (GB); Martin Klüpfel, Hockenheim (DE); Mario Rottloff, Dilsberg-Neckargemünd (DE); Ingo Schilz, Schriesheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 540 days.

(21) Appl. No.: 12/466,414

(22) Filed: May 15, 2009

(65) Prior Publication Data

US 2009/0284587 A1 Nov. 19, 2009

(30) Foreign Application Priority Data

May 15, 2008 (DE) ........................ 10 2008 023 708

(51) Int. Cl.

| | |
|---|---|
| ***G06K 15/22*** | (2006.01) |
| ***B41F 33/02*** | (2006.01) |
| ***B41F 33/00*** | (2006.01) |
| ***B41F 33/16*** | (2006.01) |

(52) U.S. Cl.

CPC ............. *B41F 33/02* (2013.01); *B41F 33/0009* (2013.01); *B41F 33/16* (2013.01)

USPC ............................. 358/1.4; 399/130; 399/382

(58) Field of Classification Search

CPC ....... G06K 15/22; G06K 15/00; G06K 15/02; G06K 2215/0082; G03G 15/50

USPC .................................... 358/1.4; 399/130, 382

See application file for complete search history.

(56) References Cited

U.S. PATENT DOCUMENTS

| | | | | |
|---|---|---|---|---|
| 4,894,774 | A * | 1/1990 | McCarthy et al. | 463/31 |
| 5,778,791 | A | 7/1998 | Albus et al. | |
| 7,664,294 | B2 | 2/2010 | Sacher et al. | |
| 2002/0172498 | A1* | 11/2002 | Esenyan et al. | 386/69 |
| 2005/0182773 | A1* | 8/2005 | Feinsmith | 707/100 |
| 2006/0119704 | A1* | 6/2006 | Buchheit | 348/143 |
| 2007/0043875 | A1* | 2/2007 | Brannon, Jr. | 709/231 |
| 2007/0150496 | A1* | 6/2007 | Feinsmith | 707/100 |

(Continued)

FOREIGN PATENT DOCUMENTS

| | | | |
|---|---|---|---|
| CN | 1784308 | A | 6/2006 |
| CN | 101094395 | A | 12/2007 |

(Continued)

OTHER PUBLICATIONS

German Search Report dated Nov. 20, 2008.

*Primary Examiner* — Phuoc Nguyen

(74) *Attorney, Agent, or Firm* — Laurence A. Greenberg; Werner H. Stemer; Ralph E. Locher

(57) ABSTRACT

A method for displaying events in printing material processing machines, includes capturing the events with at least one camera and storing the captured events on a computer. Sensors for detecting machine states are provided in the printing material processing machine. Records of the events recorded by the camera as a video sequence are electronically marked in dependence on the detected machine states. A printing machine for carrying out the method is also provided.

22 Claims, 2 Drawing Sheets

(56) References Cited

U.S. PATENT DOCUMENTS

| | | | | |
|---|---|---|---|---|
| 2007/0212031 | A1 | 9/2007 | Hikita | |
| 2007/0245305 | A1 * | 10/2007 | Anderson | 717/110 |
| 2014/0012061 | A1 * | 1/2014 | Song et al. | 600/1 |

FOREIGN PATENT DOCUMENTS

| | | | |
|---|---|---|---|
| DE | 19810239 | A1 | 7/1999 |
| DE | 10312162 | A1 | 10/2004 |
| DE | 102004015333 | A1 | 10/2005 |
| DE | 102004044673 | A1 | 3/2006 |
| JP | 6414697 | A | 1/1989 |
| JP | 06289927 | A | 10/1994 |
| JP | 8063133 | A | 3/1996 |
| JP | 8252908 | A | 10/1996 |
| JP | 11110037 | A | 4/1999 |
| JP | 2000047707 | A | 2/2000 |
| WO | 2004096547 | A2 | 11/2004 |

* cited by examiner

METHOD FOR DISPLAYING EVENTS IN PRINTING MATERIAL PROCESSING MACHINES AND VIDEO-MONITORED PRINTING MACHINE

CROSS-REFERENCE TO RELATED APPLICATION

This application claims the priority, under 35 U.S.C. §119, of German Patent Application DE 10 2008 023 708.6, filed May 15, 2008; the prior application is herewith incorporated by reference in its entirety.

BACKGROUND OF THE INVENTION

Field of the Invention

The present invention relates to a method for displaying events in printing material processing machines, wherein the events are captured through the use of at least one camera and the captured events are stored in a computer and displayed on a screen. The invention also relates to a video-monitored printing machine.

A method for displaying events in printing machines is disclosed in German Published, Non-Prosecuted Patent Application DE 10 2004 015 333 A1. That method is intended to be used to monitor processing events within a printing machine. To that end, the printing machine has a monitoring device for visually displaying processing events which includes a plurality of modules. In order to monitor the events in the printing machine, a plurality of video cameras record a picture at the respective location and transmit it to a monitor in a control station of the printing machine. Thus, within the printing machine, the sheet guidance in the printing units as well as in the delivery area is monitored through the use of video cameras. The modular construction of the monitoring technology allows simple compilation of different configurations of printing units, so that flexible construction of different printing machine configurations is possible. German Published, Non-Prosecuted Patent Application DE 10 2004 015 333 A1 therefore relates to the construction of a monitoring system with video cameras in a printing machine, without providing any advice about an effective method for capturing and displaying events in a printing machine.

SUMMARY OF THE INVENTION

It is accordingly an object of the invention to provide a method for displaying events in printing material processing machines and a video-monitored printing machine, which overcome the hereinafore-mentioned disadvantages of the heretofore-known methods and devices of this general type, which operating personnel of a printing machine can easily use and which provide the operating personnel with desired data at any time.

With the foregoing and other objects in view there is provided, in accordance with the invention, a method for displaying events in printing material processing machines. The method comprises recording or capturing records of the events with at least one camera as a video sequence, storing the records of the events on a computer, detecting machine states with sensors in the printing material processing machine, and electronically marking the records of the events recorded by the camera as the video sequence in dependence on the detected machine states.

With the objects of the invention in view, there is also provided a printing machine for carrying out the method.

The method according to the invention can be used in printing machines and in machines for further print processing. A machine according to the invention for processing printing materials has, to this end, one or more cameras which monitor the areas that need to be inspected by the operating personnel. Video cameras, in particular, which are suitable for this purpose are able to constantly capture the action at a desired location in the machine. The events captured by the cameras in this way are then transmitted to a control computer over lines, which may also be in the form of bus lines or networks such as Ethernet, and are stored on the computer. This computer expediently has a large hard disk storage, so that the monitoring pictures constantly captured as video data can be stored in large volume. In line with the invention, the printing material processing machine contains sensors which detect the machine states of the machine. These machine states include, in the case of printing machines, for example, the sheet format which is set, the inks which are used, the register settings and alignment marks or modes of operation such as recto and verso mode. Events recorded by the cameras as video sequences are then electronically marked in the machine on the basis of the machine states reported to a control computer by the sensors. In this way, the video pictures captured by the cameras are explicitly time-associated with the machine states in the printing machine. Thus, the ongoing stream of pictures from the cameras is electronically linked to the machine states in the printing machine, so that a machine state can be associated with the video pictures stored on the control computer at all times. This is of great advantage, particularly when the recorded pictures are being inspected by the operating personnel, since the operating personnel, when playing back the pictures, are automatically also shown the machine states associated therewith. This allows simplified error analysis and the correction of errors in the machine.

In accordance with another mode of the invention, the marked video sequences are played back in slowed-down form following operation of an operator control element and the slowed-down playback of video sequences on a display apparatus involves at least portions of the video sequences being skipped. In the case of rapid events in the machine, such as the transfer of sheets in a sheet printing machine, it is impossible for the eye of the operating personnel to correctly detect the transfer events in real time during playback. In order to allow the operating personnel to be aware of what is happening, provision is made for slowed-down playback of video sequences. However, so as not to lengthen the playback time overall, provision is made in this case for the slowed-down playback to involve portions of the video sequences being skipped, so that the playback time does not need to be lengthened in proportion to the slowing-down of the speed during playback. It may thus suffice if, by way of example, every tenth sheet is shown in slow motion during slowed-down playback, while the nine sheets in-between are skipped. This also allows slowed-down playback in which, on the basis of the omitted frames, at least the start of the playback of every tenth sheet is again shown in real time, whereas, with normal slow motion, only a glimpse into the past is possible and the playback limps increasingly behind the real time events in the machine the longer the slowed-down playback lasts. Such playback of individual video sequences in slowed-down playback can take place at prescribed intervals of time. In this case, the operating personnel can select an appropriate interval of time, so that unimportant video sequences are then skipped at the prescribed intervals of time and only portions of the video are played back in slowed-down fashion.

In accordance with a further mode of the invention, the operator control element is used to select production steps in the printing material processing machine and the recorded video sequences associated with the selected production steps are played back on the screen. Particularly when there are a plurality of cameras in the machine, the operating personnel feels exposed to a flood of data when all picture streams are constantly recorded. In order to restrict this, the operating personnel can first of all select particular production steps which it considers to be particularly critical and susceptible to error, with these being automatically displayed on the screen. In this way, only the selected production steps which the operating personnel itself has assessed to be critical are shown as video sequences. The pictures of noncritical production steps are not played back at all or, in a further embodiment, are even not recorded in the first place, and thus the flood of played-back data is restricted. The selectable production steps include, by way of example, startup of a printing machine through to steady established printing. Furthermore, it is possible for the pictures to be recorded by the cameras continuously and to be linked to machine states which have been selected as appropriate beforehand. These machine states may, by way of example, be the exceeding of particular rule boundaries such as the regulation of a sheet arrival in a sheet printing machine, the detection of double sheets or askew sheets or of sheet stoppages. These machine states, which are denoted as a malfunction, can then be stipulated as playback points and/or stop the recording after storage of the video sequence with the detected malfunction, in order to save storage space, so that only these erroneous machine states and the associated video sequences are displayed to the operating personnel. This allows the operating personnel to navigate through the flood of data from video pictures quickly and smoothly to the desired machine states with malfunctions and thus analyze the errors which are listed. The selected machine states are then played back in slowed-down fashion upon request so that the operating personnel can perform intensive visual error analysis. If the recording is stopped automatically after the malfunction has been detected, the malfunction is particularly easy to find, since it is the last recorded machine state, which means that there is no need for time-consuming search operations such as winding back video sequences.

In accordance with an added mode of the invention, the printing material processing machine is a sheet-processing machine and the video sequences are recorded and/or stored by the cameras on the basis of the sheet format used or the processes taking place in the sheet-processing machine. Besides the critical processes already described, which trigger the recording of video sequences or, in the case of continuous recording, are linked as information to the data stream of the video sequences, the recording by the video cameras may also be dependent on the sheet format being used. As soon as a changed sheet format is selected, the cameras adjust to the relevant sheet format by changing focal length, or possibly by the camera being rotated and panned by electric motors, or the camera proceeding with the adjusting elements of the sheet-processing machine which are responsible for format setting, so that the currently used sheet format is always detected in optimum fashion. This is necessary particularly in the case of sheet-capturing cameras in the feeder, the printing units and in the delivery of a printing machine.

In accordance with an additional mode of the invention, an operator control element is provided which can be used to select the playback of recorded video sequences on the computer in a desired manner. The aforementioned playback options, such as slowed-down playback of the desired playback speed, can be selected by using operator control elements such as a touchscreen, a mouse or similar operator control elements which control a computer. To this end, the selectable playback options are preferably displayed on a screen and selected there by using the operator control element. This allows the playback speed to be regulated by the operating personnel, for example. Furthermore, the video sequences of the desired cameras can be selected and deselected in this manner.

In accordance with yet another mode of the invention, besides recording the video sequences as a continuous stream of pictures, it is also possible to record video sequences only at prescribed intervals of time. Whereas, in the first case, slowed-down playback involves either the playback time being lengthened as appropriate or individual frames being skipped during slowed-down playback of the video sequence, this embodiment of the invention involves correspondingly fewer pictures being recorded at longer intervals of time from the outset.

In accordance with yet a further mode of the invention, it is additionally possible that after a prescribed recording time or storage volume of data, the memory for recording the video sequences in the computer is gradually overwritten starting with the video sequence which was recorded first in time. Particularly in the case of continuous recording of video sequences, a large volume of data is obtained which, after some time, pushes even very large hard disk memories to their limits. However, since the operating personnel are usually interested only in the data from recent print jobs, in this case it is possible to provide storage space for new video sequences by progressively overwriting the old video sequences. This ensures that the monitoring pictures from the last print jobs are always stored. Alternatively, it is possible to make the overwriting of all video sequences dependent on other criteria. By way of example, this can be done on the basis of the selected machine states in which the operating personnel are interested. If the operating personnel are interested in the machine states “askew sheet” and “sheet stoppage”, for example, it is possible after just a relatively short time to erase and therefore rewrite all video sequences which have not been marked with the desired machine states during recording. In this case, only the machine states selected by the operating personnel remain on the hard disk memory.

In accordance with yet an added mode of the invention, the selected machine states are either written as information into the recorded video sequences, or references in the selected machine states are recorded for the video sequences on the control computer. In both cases, the machine states are linked to the recorded video sequences in such a way that pictures and machine states correlate to one another at all times. In this way, it is also possible for the playback of video sequences to involve the information relating to the machine states being able to be displayed on a display apparatus. As soon as the computer ascertains the link to a machine state for the video sequences being played back, the relevant machine state can be displayed, so that the operating personnel can be shown the machine state and the appropriate video sequence simultaneously.

In accordance with yet an additional mode of the invention, when machine states, particularly errors, occur the video sequences which log the machine states are not overwritten. This ensures that the operating personnel can access and analyze video sequences of selected machine states, particularly for errors, at all times. In this case, it is also possible for this overwrite protection to be able to be changed only through the use of a password, e.g. by the owner of the printing house, so that the operating personnel on the printing machine cannot overwrite the selected machine states. The errors logged in this manner and the associated video sequences can also be transmitted through a network connection to a further computer for evaluation. This computer may be located in the printing house, but it may also be set up with the maintenance and servicing service of the respective machine. This allows the maintenance and servicing service to analyze errors at all times if this is required by the operator of the respective machine.

In accordance with a concomitant mode of the invention, if there are a plurality of video cameras in the machine, it is possible for a plurality of video sequences to be recorded simultaneously which can then also be shown in parallel and in sync on a screen during the playback. This allows the operating personnel to simultaneously display simultaneously occurring machine states and the associated video sequences, e.g. on a large screen. In particular, the operating personnel can thus have an overview of the pictures from the cameras of the feeder, delivery and printing units, for example, next to one another on a screen. The operating personnel can select the relevant camera positions having recordings which are intended to be displayed simultaneously, so that the video sequences can be displayed entirely according to the requirements of the operating personnel. Thus, the playback of video sequences for particular machine states selected by the user can also be automatically switched to the foreground on the screen, so that the playback is not concealed by screen menus.

However, such video recording allows not only quickly occurring errors in machines which handle printing material to be analyzed. The video recordings can also be used to document the print quality in printing machines. Thus, by way of example, the customer of a printing house can select machine states during the printing process which are important to him or her, which are then recorded as video sequences during the ongoing print job. When the print job has been performed, the customer then receives not only the printing materials produced but also a data storage medium or, through the Internet, a file with the customer's previously selected machine states and video sequences for documenting quality. This allows the customer himself or herself to check if the machine states arising during the printing process which he or she considers critical have been handled satisfactorily in the printing house. This allows effective documentation of quality.

Other features which are considered as characteristic for the invention are set forth in the appended claims.

Although the invention is illustrated and described herein as embodied in a method for displaying events in printing material processing machines and a video-monitored printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
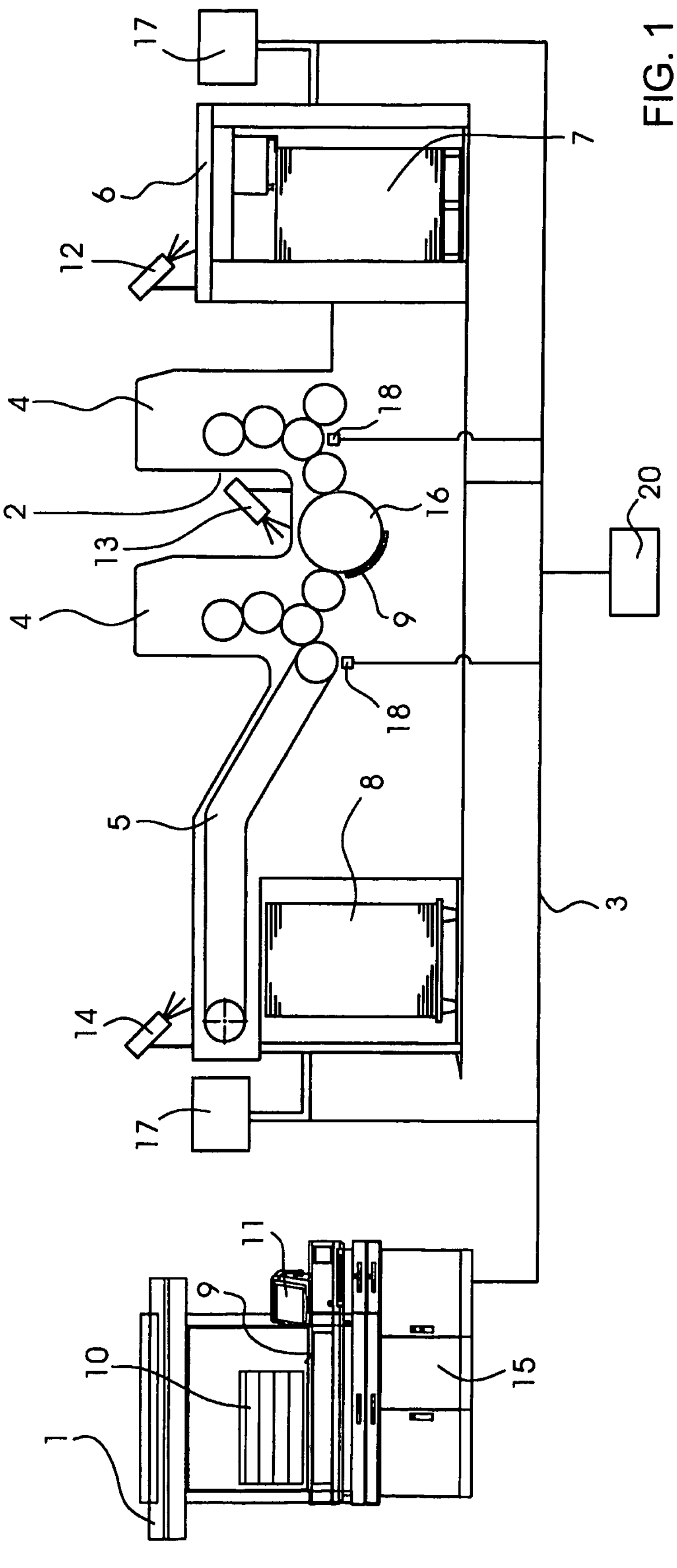
FIG. 1 is a diagrammatic, longitudinal-sectional view of a sheet printing machine with a plurality of cameras and a connected control station.

Referring now to the figures of the drawings in detail and first, particularly, to FIG. 1 thereof, there is seen a sheet-fed printing machine 2 with two printing units 4. The printing machine 2 is supplied by a feeder 6 with printing sheets 9 which are taken from a feeder stack 7. The feeder 6 conveys the sheets 9 to the printing units 4, where they are printed with ink. In the last printing unit 4, the sheets 9 are sent to a delivery 5, where they are deposited on a delivery stack 8. The printing machine 2 transports the printing sheets 9 from the feeder 6 to the delivery 5 using cylinders 16. The printing machine 2 can be controlled from an operator control station 1 which has a control computer 15. The control computer 15 is connected to electrical drives in the printing machine 2 through the use of a communication link 3 which is in the form of a network link, such as a CAN bus or an Ethernet link. The operator control station 1 also has an operator control element in the form of a touchscreen 11 and a large screen 10, which are likewise connected to the control computer 15. Both the touchscreen 11 and the large screen 10 can display graphical user interfaces (GUIs) which can be used to control the printing machine 2. The touchscreen 11 can also be used to input operator control commands in order to change settings of the printing machine 2 and to control the playback of video pictures. Furthermore, the printing machine 2 has a camera 12 on the feeder 6, a camera 14 on the delivery 5 and a camera 13 between the printing units 4. It is also conceivable for there to be cameras at further positions in the printing machine, e.g. additionally at the drive side or operating side of a printing machine 2 in one or more printing units 4. The cameras 12, 13, 14 are provided for the purpose of capturing the printing sheets 9 transported through the printing machine 2 and thus continuously capturing the sheet transport in the printing machine 2. The cameras 12, 13, 14 are likewise connected to the communication link 3 and in this way are able to send picture data to the control computer 15. The picture data are stored in a memory in the control computer 15 and can then be viewed by the operating personnel on the touchscreen 11 and the large screen 10.

In addition, the printing machine 2 has further screens 17 on the feeder 6 and on the delivery 5, which can likewise be used to display the picture data from the cameras 12, 13, 14. This means that the operating personnel can also inspect the picture data from the camera 12 of the feeder 6, on the delivery 5, just as, conversely, the picture data from the delivery 5 can be inspected on the feeder 6. Furthermore, the communication link 3 is also connected to a further computer 20, which may be located outside of the printing house and to which the picture data stored on the control computer 15 can also be transmitted in the form of video sequences 19. This further computer 20 may also be located with a servicing or maintenance provider which is responsible for maintaining the printing machine 2. If errors arise on the printing machine 2, this service provider can, with the approval of the operating personnel, have the video sequences 19 which are stored in the control computer 15 from the cameras 12, 13, 14 sent to his or her computer 20 and can analyze them there. The service personnel can then in turn send assistance through the communication link 3 to the control computer 15 and therefore the operating personnel for the printing machine 2 on the basis of this analysis and this assistance can then be displayed on the screens 10, 11.

The printing machine 2 also contains sensors 18 which can be used to detect machine states of the printing machine 2. Signals detected by the sensors 18 are likewise transmitted through the communication link 3 to the control computer 15. The control computer 15 can then associate the timing of the machine states detected by the sensors 18 with that of the video sequences captured by the video cameras 12, 13, 14, or produce appropriate references, on the basis of time stamps which respectively contain the real time. In this way, the machine states can be time-linked to the video sequences 19, so that when the video sequences 19 are played back, the relevant machine states can likewise be displayed. Furthermore, the operating personnel can use the touchscreen 11 to select desired machine states, in which case the recorded video sequences 19 are searched for the desired machine states and only the selected video sequences 19 are played back on the touchscreen 11 or the large screen 10. Thus, when video sequences 19 are recorded constantly by the cameras 12, 13, 14, the operating personnel can select machine states such as "sheet stoppage" which are then displayed at the touch of a button. The operating personnel thus do not need to search all video sequences 19 for the desired machine state "sheet stoppage", but rather can concentrate on the desired state and perform an analysis which can be used to prevent such sheet stoppage in the printing machine 2 in the future.

Figure 2:
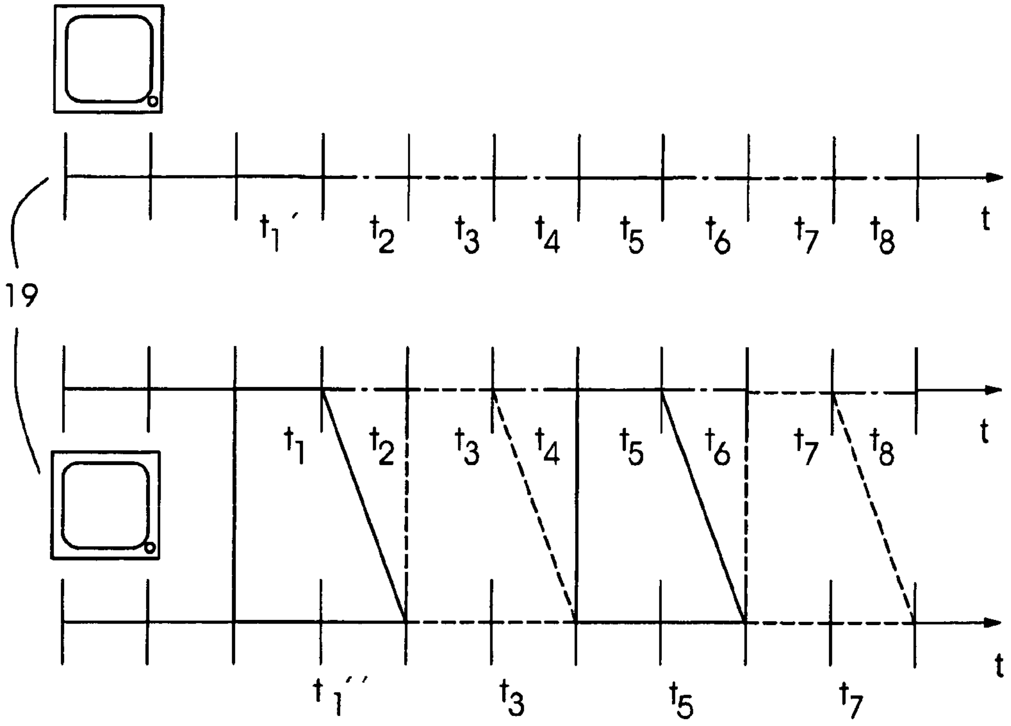
FIG. 2 shows a first slow-motion playback mode with frames omitted.

The pictures from the cameras 12, 13, 14 can either be captured on the control computer 15 in the form of continuous video streams, which allow fluid playback in real time, or it is possible for pictures to be recorded at particular intervals of time t. If complete video streams are recorded, they can be played back in slow motion, after having been slowed down, by the operating personnel on the touchscreen 11 and the large screen 10 for the purpose of error analysis. Such slowed-down playback of video sequences 19 is shown in FIG. 2. In this case, all pictures are captured continuously by the video cameras 12, 13, 14 and stored on the control computer 15. The recorded pictures are then displayed in slowed-down fashion in line with the selected slow-motion speed so that, by way of example, it is possible to see the full sheet transport. In this context, the chosen playback speed is taken as a basis for playing back only every tenth frame, for example, so that the playback time is not lengthened excessively overall.

Figure 3:
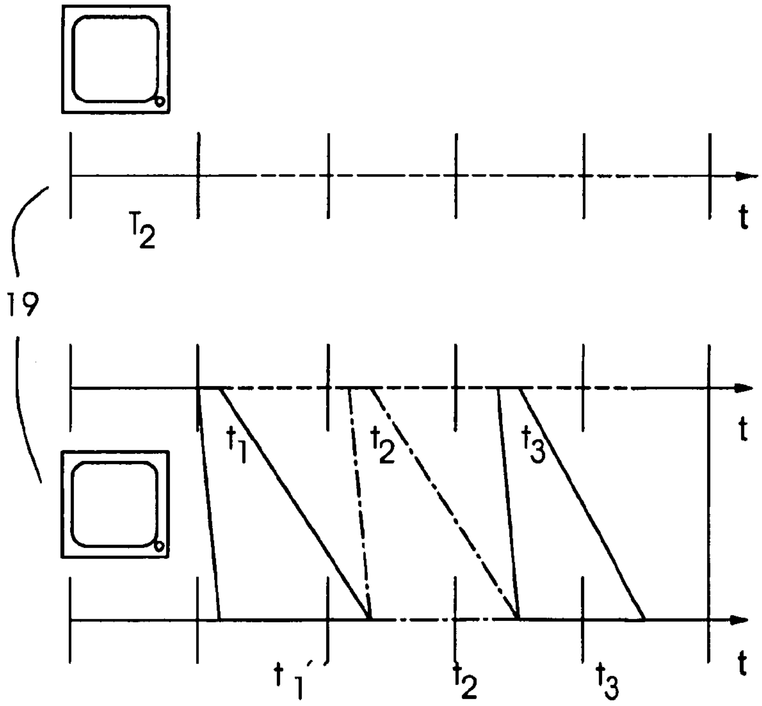
FIG. 3 shows a second slow-motion playback mode for displaying the movement of printing sheets.

By contrast, FIG. 3 depicts a special playback in which individual frames are played back in order to show the movement of a sheet, which is achieved by virtue of frames being skipped at particular intervals of time t in line with the selected slow-motion playback. If the cameras capture 25 frames per second, for example, only every $26^{th}$ frame is shown in this case, which means that each time a different sheet 9 is shown in a different position captured by the same camera. The observer then has the impression of it being the same sheet 9 moving slowly, so that the impression of a sheet 9 moving through the machine is formed. However, a steady machine speed is required for this kind of playback, since changes of speed in the printing machine 2 result in the pictures being shown distorted on the screens 10, 11, or there need to be sensors in the machine 2 or image processing software on the computer 15 which are able to determine the point at which the next frame is displayed in order to prevent distortion.

The configuration in FIG. 1 not only allows errors in the sheet movement in the printing machine 2 to be recorded and analyzed, but also allows quality control to take place, in which certain events in the printing machine 2 are selected by the operating personnel as being crucial to quality and the selected events are taken as a basis for recording video sequences 19 using the cameras 12, 13, 14. These video sequences 19 can then be transferred as a file for quality assurance to the customers for the respective print order, so that the customer can check the printing process himself or herself.

The invention claimed is:

1. A method for displaying events in printing material processing machines, the method comprising the following steps:

pointing at least one camera directly toward a stream of sheets all passing through at least one location in a printing material processing machine;

recording records of the events with the at least one camera as an ongoing picture stream of the passing sheets;

storing the records of the events on a computer;

detecting machine states with sensors in the printing material processing machine; and electronically marking the records of the events in the ongoing stream of pictures recorded by the at least one camera pointing directly at the sheets as a video sequence automatically by the computer in dependence on the detected machine states.

2. The method according to claim 1, which further comprises:

playing back the marked video sequences in slowed-down form following operation of an operator control element; and skipping at least portions of the video sequences during the slowed-down playback of the video sequences on a display apparatus.

3. The method according to claim 2, which further comprises carrying out the step of skipping at least portions of the video sequences by skipping portions of individual video sequences at prescribed intervals of time.

4. The method according to claim 1, which further comprises:

selecting production steps in the printing material processing machine with an operator control element; and playing back the recorded video sequences associated with the selected production steps on a screen.

5. The method according to claim 1, which further comprises:

providing a sheet-processing machine as the printing material processing machine;

recording sheets at a plurality of locations in the sheet-processing machine with the at least one camera; and storing the recorded sheets as video sequences provided with electronic identification data on the computer.

6. The method according to claim 5, which further comprises using the computer to take the video sequences recorded by the at least one camera, select pictures of the same sheet at different positions in the sheet-processing machine and display them as a new video sequence on a screen.

7. The method according to claim 1, which further comprises:

providing a sheet-processing machine as the printing material processing machine; and recording and/or storing the video sequences with the at least one camera in dependence on a sheet format used or processes taking place in the sheet-processing machine.

8. The method according to claim 1, which further comprises selecting the playback of recorded video sequences on the computer in a desired manner with an operator control element.

9. The method according to claim 1, which further comprises:

recording a continuous stream of pictures as the video sequence; and skipping frames in the video sequence in a slowed-down playback.

10. The method according to claim 1, which further comprises only recording pictures at prescribed intervals of time during the recording of the video sequences.

11. The method according to claim 1, which further comprises, after a prescribed recording time or storage volume of data, gradually overwriting a memory for recording the video sequences in the computer starting with a video sequence having been recorded first in time.

12. The method according to claim 11, which further comprises providing information relating to machine states in data in the recorded video sequences or providing references in the machine states for the video sequences.

13. The method according to claim 12, which further comprises displaying the information relating to machine states on a display device during the playback of video sequences.

14. The method according to claim 12, which further comprises not overwriting video sequences logging the machine states on the computer and/or stopping further recording of video sequences, when particular machine states occur.

15. The method according to claim 14, wherein the particular machine states are errors.

16. The method according to claim 14, which further comprises selecting or inputting machine states with an operator control element resulting in a video sequence being recorded.

17. The method according to claim 15, which further comprises transmitting the video sequences logging the errors over a network connection to a further computer for evaluation.

18. The method according to claim 1, which further comprises:

providing the at least one camera as a plurality of cameras in the machine;

storing video sequences from each camera on the computer; and displaying simultaneously recorded video sequences in parallel during a playback of the video sequences.

19. The method according to claim 18, which further comprises selecting or inputting machine states with an operator control element resulting in a video sequence being recorded.

20. The method according to claim 1, which further comprises automatically switching a playback of video sequences from particular cameras to a foreground of a screen and displaying it in dependence on machine states.

21. A printing machine for carrying out the method according to claim 1.

22. The method according to claim 1, wherein the printing processing events are transferring the sheets.

* * * * *